US 8,650,611 B2

(12) United States Patent
Heo

(10) Patent No.: US 8,650,611 B2
(45) Date of Patent: Feb. 11, 2014

(54) IMAGE FORMING APPARATUS AND METHOD OF SETTING SECURITY POLICY THEREOF

(75) Inventor: Nam Heo, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 278 days.

(21) Appl. No.: 12/900,970

(22) Filed: Oct. 8, 2010

(65) Prior Publication Data

US 2011/0162036 A1  Jun. 30, 2011

(30) Foreign Application Priority Data

Dec. 24, 2009  (KR) .................. 10-2009-0130864

(51) Int. Cl.
*H04L 29/06* (2006.01)
(52) U.S. Cl.
USPC ............. 726/2; 726/27; 726/1; 713/182
(58) Field of Classification Search
USPC .......................................................... 726/1, 2
See application file for complete search history.

(56) References Cited

U.S. PATENT DOCUMENTS

| | | | |
|---|---|---|---|
| 6,671,810 B1 * | 12/2003 | Jardin ............................... 726/3 |
| 7,324,233 B2 * | 1/2008 | Shima et al. ................. 358/1.15 |
| 7,555,769 B1 * | 6/2009 | Shapiro et al. ..................... 726/1 |
| 8,117,640 B1 * | 2/2012 | Moriconi et al. ................. 726/1 |
| 2004/0215978 A1 * | 10/2004 | Okajo et al. .................. 713/201 |
| 2005/0022033 A1 * | 1/2005 | Han ............................... 713/201 |
| 2007/0033643 A1 * | 2/2007 | Rossi et al. ..................... 726/10 |
| 2009/0171900 A1 * | 7/2009 | Phillips et al. ..................... 707/3 |
| 2010/0064341 A1 * | 3/2010 | Aldera ............................. 726/1 |

FOREIGN PATENT DOCUMENTS

| | | |
|---|---|---|
| EP | 2 093 690 A1 | 8/2009 |
| KR | 20090059694 | 6/2009 |
| WO | WO 2007110094 A1 * | 10/2007 |
| WO | 2009/072755 | 6/2009 |

OTHER PUBLICATIONS

Extended European Search Report issued Mar. 25, 2011 in EP Application No. 10193250.7.

* cited by examiner

*Primary Examiner* — Mohammad L Rahman
(74) *Attorney, Agent, or Firm* — Stanzione & Kim, LLP

(57) ABSTRACT

An image forming apparatus including a communication interface unit to access an external device storing at least one security provider corresponding to user authentication, a user interface (UI) unit to select the security provider, a storage unit to receive the selected security provider from the external device and store the received security provider, a control unit to install the stored security provider in the image forming apparatus, select at least one application to apply the installed security provider, and set the installed security provider as a user authenticator for the at least one selected application.

24 Claims, 10 Drawing Sheets

FIG. 6

|     | No | Appl. Name | State |
| --- | --- | --- | --- |
| 621 | 1 | Copy | disable |
| 622 | 2 | DeviceSetup | ☑ enable |
| 623 | 3 | Fax | ☑ enable |
| 624 | 4 | Print | ☑ enable |
| 625 | 5 | ScanToEmail | ☑ enable |

Machine is going in Low Power Save Mode

Mach.Setup > Authentication > Authentication State

6 Results    1/2 Pages

Enable/Disable    ✓ OK    ✗ Cancel

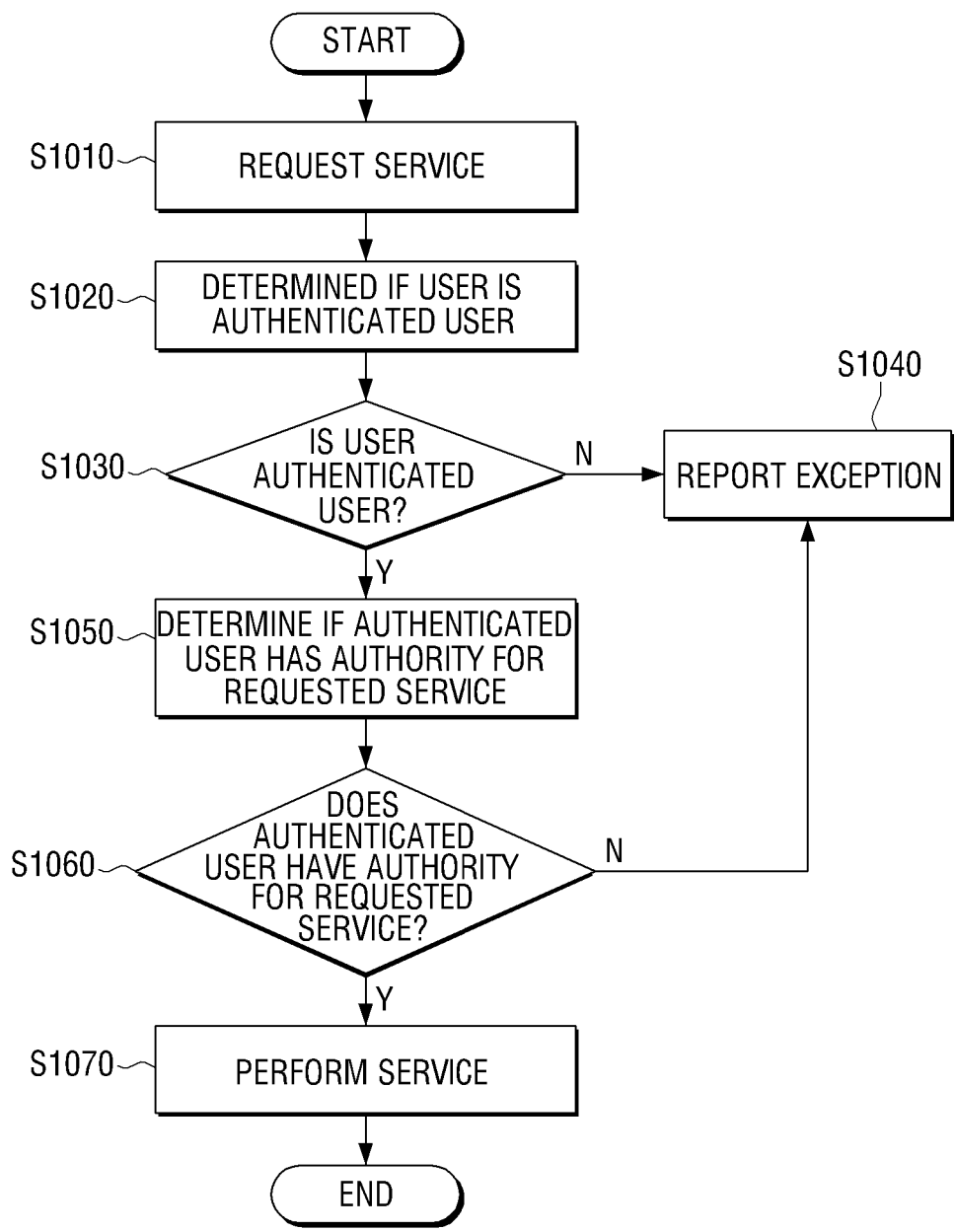

IMAGE FORMING APPARATUS AND METHOD OF SETTING SECURITY POLICY THEREOF

CROSS-REFERENCE TO RELATED APPLICATIONS

This application claims priority under 35 U.S.C. §119 (a) from Korean Patent Application No. 10-2009-0130864, filed on Dec. 24, 2009, in the Korean Intellectual Property Office, the disclosure of which is incorporated herein by reference in its entirety.

BACKGROUND

1. Field of the Invention

The present general inventive concept relates to an image forming apparatus and a method of setting security policy thereof. More particularly, the present general inventive concept relates to an image forming apparatus and a method of dynamically setting security policy by receiving a security provider from an external device and installing the security provider in an open framework.

2. Description of the Related Art

Image forming apparatuses are devices which print printing data generated by terminal devices such as computers on paper. Examples of an image forming apparatus are copiers, printers, fax machines, and multifunction peripherals (MFPs) incorporating the functions of the aforementioned devices.

As security is increasingly important, image forming apparatuses support functions related to security. However, in order to apply new security policy to an application requiring security in the image forming apparatus, development of new software and installation of developed software in the image forming apparatus are needed.

More specifically, in a security application installed in a conventional image forming apparatus, the manufacturer must newly change software according to a user's request for change due to the structure of the software of the image forming apparatus having strong connection between user authentication and an access control method. Accordingly, the manufacturer has difficulty in changing software according to each user's security policy.

SUMMARY

The present general inventive concept provides to an image forming apparatus and a method of dynamically setting security policy by receiving a security provider from an external device and installing the security provider in an open framework.

Additional features and utilities of the present general inventive concept will be set forth in part in the description which follows and, in part, will be obvious from the description, or may be learned by practice of the general inventive concept.

Exemplary embodiments of the present general inventive concept may provide a method of setting security policy of an image forming apparatus which is connectable to an external device via a communication interface and includes an open framework on which applications corresponding to a plurality of functions are installed, the method including accessing the external device storing at least one security provider corresponding to user authentication via the communication interface, selecting the security provider, receiving the selected security provider at the image forming apparatus, installing the received security provider in the image forming apparatus, and selecting at least one application to apply the installed security provider and setting the installed security provider as a user authenticator for the at least one selected application.

The method may further include displaying the received security provider, wherein in the installing of the received security provider, a security provider selected from the displayed security provider is installed in the image forming apparatus.

In the setting of the installed security provider, the installed security provider may be set as the user authenticator for the selected application using security information corresponding to the at least one selected application.

The method may further include mapping the at least one selected application onto the installed security provider and store mapping information as a database, and displaying the stored database.

The installing of the received security provider can include determining if the received security provider is suitable for the image forming apparatus, and installing the received security provider in the image forming apparatus when it is determined that the received security provider is suitable for the image forming apparatus.

The method may include receiving a request to perform a function provided by the image forming apparatus, performing authentication for the request using a security provider corresponding to the requested function, and providing the requested function using an application corresponding to the request when the request is authenticated.

In the performing of authentication, when the request is unauthenticated, authenticating the request using a security provider which is different from the security provider corresponding to the requested function.

Exemplary embodiments of the present general inventive concept may also provide a method of setting security policy of an image forming apparatus which is connectable to an external device via a communication interface and includes an open framework on which applications corresponding to a plurality of functions are installed, the method including receiving a command to change the security policy of the image forming apparatus, displaying the security policy set for the image forming apparatus and security providers installed in the image forming apparatus, selecting at least one of the displayed security providers, and setting the selected security provider as a user authenticator for the plurality of applications.

The command to change the security policy may be received through at least one of the external device and a user interface window of the image forming apparatus.

The method may include selecting at least one application to apply the selected security provider, wherein in the setting of the selected security provider, the selected security provider is set as the user authenticator for the at least one selected application.

The method may include selecting a security mode, wherein in the setting of the selected security provider, the selected security provider is set as the user authenticator for the at least one selected application according to the selected security mode.

The security mode may include at least one of a first security mode in which authentication is not performed, a second security mode in which authentication is performed using a single security provider, and a third security mode in which authentication is performed using a plurality of security providers.

Exemplary embodiments of the present general inventive concept may also provide an image forming apparatus which is connectable to an external device and comprises an open framework on which applications corresponding to a plurality of functions are installed, the image forming apparatus including a communication interface unit to access the external device storing at least one security provider corresponding to user authentication, a user interface (UI) unit to select the security provider, a storage unit to receive the selected security provider from the external device and store the received security provider, a control unit to install the stored security provider in the image forming apparatus, select at least one application to apply the installed security provider, and set the installed security provider as a user authenticator for the at least one selected application.

The UI unit may display the stored security provider, and the control unit may install a security provider selected from the displayed security provider in the image forming apparatus.

The control unit may set the installed security provider as the user authenticator for the selected application using security information corresponding to the at least one selected application.

The storage unit may map the at least one selected application onto the installed security provider and store mapping information as a database.

The UI unit may display a first UI window to select the security provider installed in the image forming apparatus, and when the security provider is selected through the first UI window, the UI unit may display a second UI window to select an application to perform authentication using the selected security provider, and when the application is selected through the second UI window, the control unit changes the security policy to authenticate using the selected security provider when the selected application operates.

The UI unit may display a first UI window to select the security provider installed in the image forming apparatus, and wherein if the security provider is selected through the first UI window, the control unit changes the security policy to authenticate using the selected security provider when the plurality of applications operate.

The control unit may determine if the stored security provider is suitable for the image forming apparatus, and when the stored security provider is suitable for the image forming apparatus, the stored security provider may be installed in the image forming apparatus.

The communication interface unit or the UI unit may receive a request to perform a function provided by the image forming apparatus, and the control unit may perform authentication for the request using a security provider corresponding to the requested function, and provide the requested function using an application corresponding to the request when the request is authenticated.

Exemplary embodiments of the present general inventive concept also provide a method of setting security policy of an image forming apparatus, the method including receiving a selection of at least one security provider stored on an external device that is communicatively coupled to the image forming apparatus, the at least one security provider to be installed on the image forming apparatus, installing the selected at least one security provider, and setting the selected security provider as a user authenticator for at least one function of the image forming apparatus.

The method may include where the installing of the selected security provider includes determining if the selected security provider is suitable for the image forming apparatus, and installing the selected security provider in the image forming apparatus when it is determined that the selected security provider is suitable for the image forming apparatus.

The method may also include where the determining if the selected security provider is suitable for the image forming apparatus includes determining whether the user authenticator can authenticate a user with the selected security provider, and when the user authenticator can not authenticate the user with the selected security provider, setting another selected security provider as the user authenticator to authenticate the user.

The method may also include receiving a request to perform a first function of the at least one function provided by the image forming apparatus, performing authentication for the request with a first security provider of the installed at least one security provider corresponding to the requested function, and providing the requested first function when the request is authenticated.

Exemplary embodiments of the present general inventive concept may also provide an image forming apparatus, including an interface to receive a selection of at least one security provider stored on an external device that is communicatively coupled to the image forming apparatus, the at least one security provider to be installed on the image forming apparatus, and a controller to install the selected at least one security provider on the image forming apparatus, and to set the selected security provider as a user authenticator for at least one function of the image forming apparatus.

The apparatus may also include where the controller determines if the selected security provider is suitable for the image forming apparatus, and installs the selected security provider in the image forming apparatus when it is determined that the selected security provider is suitable for the image forming apparatus.

The apparatus may also include where the controller determines whether the user authenticator can authenticate a user with the selected security provider, and the controller sets another selected security provider as the user authenticator to authenticate the user when the user authenticator cannot authenticate the user with the selected security provider.

The apparatus may also include where the interface receives a request to perform a first function of the at least one function provided by the image forming apparatus, and the controller performs authentication for the request with a first security provider of the installed at least one security provider corresponding to the requested function, and the image forming apparatus provides the requested first function when the request is authenticated by the controller.

BRIEF DESCRIPTION OF THE DRAWINGS

These and/or other features and utilities of the present general inventive will become apparent and more readily appreciated from the following description of the embodiments, taken in conjunction with the accompanying drawings of which:

FIGS. 4 through 6 illustrate user interface windows displayed on a user interface unit illustrated in FIG. 1;

FIGS. 9 and 10 are flowcharts illustrating the operation of providing a service illustrated in FIG. 7 in greater detail.

DETAILED DESCRIPTION OF THE EMBODIMENTS

Figure 1:
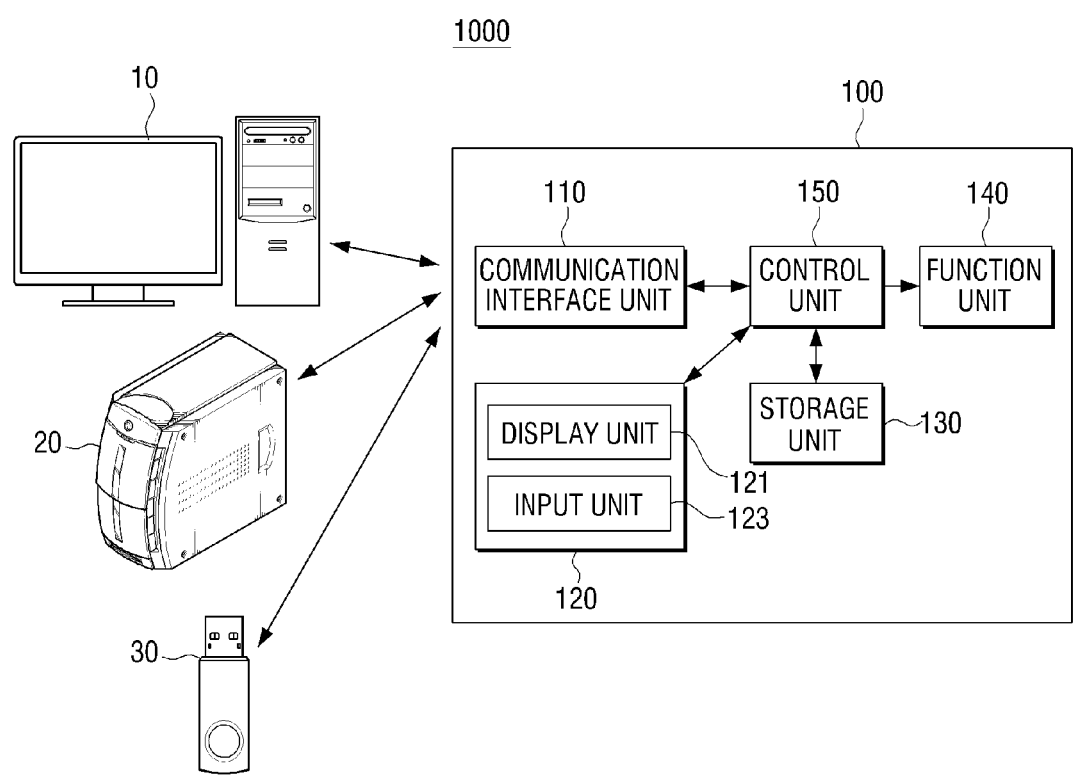
FIG. 1 is a block diagram illustrating a configuration of an image forming apparatus according to exemplary embodiments of the present general inventive concept.

Reference will now be made in detail to the present embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating a system 1000 including an image forming apparatus according to exemplary embodiments of the present general inventive concept. As illustrated in FIG. 1, the image forming apparatus 100 may include a communication interface unit 110, a user interface (UI) unit 120, a storage unit 130, a function unit 140, and a control unit 150.

The communication interface unit 110 may communicatively couple the image forming apparatus 100 to external devices 10, 20, 30 via a local area network (LAN) connection, an Internet connection, or a universal serial bus (USB) port connection. That is, the communication interface 110 may be communicatively coupled to a wired/and or wireless communication network, to which external devices 10, 20, and 30 may also be communicatively coupled to.

The communication interface unit 110 may access an external device providing a security provider. More specifically, the communication interface unit 110 may access an external device, such as the printing control terminal device 10, a management server 20, or a portable storage medium 30, which may provide a security provider. The communication interface unit 110 may receive a list of security providers which the external devices 10, 20, and 30 may store. The paths to access the printing control terminal device 10 and the management server 20 may be pre-stored in the image forming apparatus 100, or may be input through the UI unit 120 by the user. The external device can store at least one security provider corresponding to user authentication, and may be the printing control terminal device (host device) 10, the server 20, or the portable storage medium 30 such as an exterior hard disk drive (HDD), USB memory, and a memory card.

A security provider can indicate and/or identify a program which performs authentication and authorization control in the image forming apparatus 100. For example, a security provider may be a security provider using an identification (ID) and a password, a security provider using information received from a magnetic card or a radio frequency (RF) card, a security provider using a fingerprint, or a security provider using an iris and/or retina of a human eye. A security provider may be installed on the open framework of the image forming apparatus in a bundle form on, for example, an OSGi (Open Services Gateway initiative) open framework.

The communication interface unit 110 may receive a security provider (e.g., a security provider selected by the user) from the external device 10, 20, and/or 30. More specifically, the communication interface unit 110 may receive a security provider (e.g., selected by the user) from among a plurality of security providers from the printing control terminal device 10, the management server 20, and/or the portable storage medium 30.

The communication interface unit 110 may receive a command to change a security policy from an external device. More specifically, the communication interface unit 110 may receive a command to change security policy of the image forming apparatus 100 from the printing control terminal device 10 and/or the management server 20.

The communication interface unit 110 may receive a request to perform a function (or a service) of the image forming apparatus 100 from an external device. More specifically, the communication interface unit 110 may receive a request to perform a copying service, a printing service, a faxing service, and/or a scanning service of the image forming apparatus 100 from the printing control terminal device 10 or the management server 20. The communication interface unit 110 may report the results of the performed function and/or service to at least the external device which requested the service.

If an external device 10 and/or 20 requesting a service and/or function is an unauthenticated external and/or unauthorized external device, the communication interface unit 110 can transmit an error message reporting that the requested service and/or function may not be performed to the external device 10 and/or 20.

The UI unit 120 may include a plurality of function keys to set and/or select one or more functions supported by the image forming apparatus 100. That is, the UI unit 120 may receive one or more selections to set one or more functions of the image forming apparatus 100. The UI unit 120 can display information provided by at least the image forming apparatus 100. The UI unit 120 may be a device which to receive input and provide output, such as a touch pad, or as a combination of an input unit 123, such as a mouse or a keyboard, and a display unit 121, such as a cathode-ray tube (CRT), a liquid crystal display (LCD), Organic Light Emitting Diode (OLED), or a light emitting diode (LED). The user may select a security provider to be installed in the image forming apparatus 100 according to information regarding a plurality of security providers displayed on the display unit 123, and may set security policy to be applied to the image forming apparatus 100. That is, the image forming apparatus 100 may receive a selection of a security provider, and may set security policy to be applied.

The UI unit 120 may display a UI window to set and or receive a selection of a security policy of the image forming apparatus 100. More specifically, the user interface unit 120 may display a UI window to receive a selection of a security mode and/or set a security mode, a UI window to set a security provider set on the open framework, or a UI window to set an application to perform authentication using a selected security provider. The UI unit 120 may display a UI window to display security policy set and/or to be set for the image forming apparatus 100 and a security provider pre-installed in the image forming apparatus 100, and may receive one or more settings of security policy through the displayed UI window. That is, the UI unit 120 may display security policy and/or receive one or more selections of setting for security policy for the image forming apparatus 100. Detailed description of the UI windows is described below with reference to FIGS. 4 through 6.

If the user requests a function and/or service, the UI unit 120 can display a log-on UI window to authenticate the user. More specifically, the UI unit 120 may display a UI window provided by a security provider corresponding to the function and/or service requested by the user.

If the user requesting a service is an unauthenticated and/or unauthorized user, the UI unit 120 may display an error message reporting that the requested service may not be performed.

The storage unit 130 may store one or more applications for the image forming apparatus 100. The storage unit 130 may store (e.g., temporarily store) a security provider received through the communication interface unit 110. The storage unit 130 may be a storage medium embedded in the image forming apparatus 100, or an external storage medium, for example, a removable disk including USB memory, a storage medium which is connected to a host, and/or a web server through a network.

An application may be a program which provides a function and/or service (e.g., performed on the OSGi open framework). For example, if an OSGi-based device is an image forming apparatus, a service may include one or more functions provided by the image forming apparatus such as printing, copying, faxing, scanning, scan to PC (personal computer), and scan to FTP (file transfer protocol), and an application may be a printing application, a copying application, a faxing application, a scanning application, a scan to PC application, and a scan to FTP application which provide the services. An application can have the same concept as a bundle on the OSGi open framework.

The storage unit 130 may store security information to be applied to one or more applications (e.g., each application). Security information can be information which is used to determine if a user requesting a service is an authenticated user and if the authenticated user has the authority to use the service. Such security information may be stored distinguishingly (e.g., stored separately) according to the application. For example, the storage unit 130 may distinguish and store an available user list for a printing application and an available user list for a scanning application.

Such security information may be distinguishingly stored (e.g., separately stored) for the same application. That is, different applications that are installed and/or are available to the image forming apparatus 100 may each have security information stored (e.g., the security information may be different for each application, or may be the same for two or more applications, or may be different for two or more applications, etc.). For example, the storage unit 130 may store security information that only mono printing is available for user A with respect to the printing application. That is, the storage unit 130 may store security information that color printing is not available for user A.

The storage unit 130 may map at least one selected application onto an installed security provider and store the mapping information as a database. More specifically, the storage unit 130 can map the relation between an application and a security provider corresponding to settings of security policy of the control unit 150 and can store the mapping relation as a database. The stored database may be displayed on the UI unit 120. The user and/or an administrator may modify the security policy by modifying the displayed mapping relation.

The function unit 140 may perform one or more functions supported by the image forming apparatus 100. More specifically, the function unit 140 may include an image forming unit, a scanning unit, a faxing unit, etc. Using these components, the function unit 140 can perform a function corresponding to a service requested by the user. For example, if a printing job is received through the communication interface unit 110, the function unit 140 can print a document using the image forming unit. If a copying job is received through the UI unit 120, the function unit 140 can scan a document using the scanning unit and prints the scanned document using the image forming unit.

The control unit 150 may control the communication interface unit 110 to receive a list of security providers stored in an external device if a command to change security policy is received from the user, and may control the UI unit 120 to display the received list of security providers. The control unit 150 may display one or more application security providers which can be installed in the image forming apparatus 100 from the list. For example, if an RF reader is not installed in the image forming apparatus 100, the control unit 150 may not display a security provider to perform authentication using an RF reader, or may display an icon and/or a message reporting that the security provider is not available in the image forming apparatus 100, along with the list. Such operation may be performed by the image forming apparatus 100 or by the management server 20 of the image forming apparatus 100. That is, to change security policy of the image forming apparatus 100, the management server 20 may provide the image forming apparatus 100 with the security providers stored in the management server 20.

If the user selects a security provider to be installed, the control unit 150 may control the communication interface unit 110 to receive the selected security provider from the external device and control the storage unit 130 to store the received security provider.

The control unit 150 may determine if the stored security provider is available to the image forming apparatus 100. More specifically, if an RF reader or a magnetic reader is not installed in the image forming apparatus 100 and if the security provider selected by the user is a security provider performing authentication using an RF card, the control unit 150 may control the UI unit 120 to display a message reporting that the stored security provider may not be installed in the image forming apparatus 100.

The control unit 150 may install the stored security provider on the open framework. The security provider may be installed on the open framework in the same way a general bundle is installed on the OSGi framework, so detailed description is omitted.

The control unit 150 may set security policy of the image forming apparatus 100 using an installed security provider. More specifically, the control unit 150 may control the UI unit 120 to display a UI window to select a security mode to be applied to the image forming apparatus 100, and may change security settings according to the security mode selected by the user.

If the user selects a first security mode in which authentication is not performed, the control unit 150 may set security policy not to perform authentication and authorization control for the user's service request.

If the user selects a second security mode in which authentication is performed using a single security provider, the control unit 150 may control the UI unit 120 to display a UI window to set a security provider installed on the open framework, and may set security policy to perform authentication for the user's service request using a security provider selected by the user.

If the user selects a third security mode in which authentication is performed using a security provider corresponding to an application, the control unit 150 may control the UI unit 120 to display a first UI window to select a security provider installed on the open framework, may control a second UI window to select an application to apply the selected security provider, and may set security policy to perform authentication for the user's service request using the security provider selected by the user when the selected application operates. That is, the security provider selected by the user can be set as a user authentication method of the application selected by the user.

These security modes are examples of settings of security policy for the user to set security policy to be applied to the image forming apparatus 100. In exemplary embodiments of the present general inventive concept, the three security modes are described, but the security modes are not limited thereto. In exemplary embodiments of the present general inventive concept, the user can select a security provider to be applied and can select an application to apply the selected security provider so that security policy can be changed. However, it is possible that a security provider can be received from an external device, installed, and applied to one or more of the application (e.g., all the applications) so that security policy can be set automatically.

The control unit 150 may change security policy using security information corresponding to a selected application. For example, when security information corresponding to an application selected by the user includes a user ID and a password, if the user selects a security provider performing authentication using a separate authentication code, the control unit 150 can set security policy not to apply the security provider to the application.

If a function and/or service of the image forming apparatus 100 is requested through the external device 10, 20, and/or the UI unit 120, the control unit 150 can check authentication and authorization using a security provider corresponding to the requested function (application) and can perform the requested function if the request is authenticated and authorized. Detailed operation of the control unit 150 is described with reference to FIGS. 2 and 3.

Figure 2:
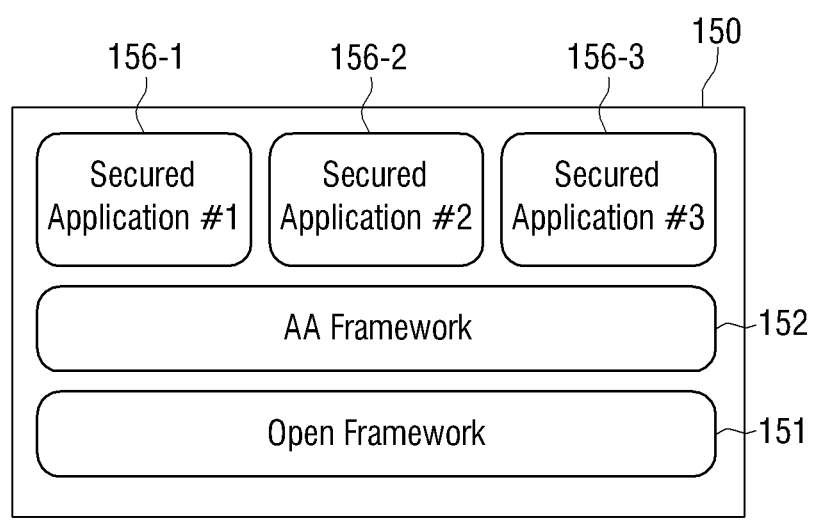
FIGS. 2 and 3 are block diagrams illustrating a control unit illustrated in FIG. 1.

FIG. 2 is a block diagram illustrating a configuration of the control unit 150 according to exemplary embodiments of the present general inventive concept.

Referring to FIG. 2, the control unit 150 may include an open framework 151, an authentication and authorization (AA) framework 152, and a plurality of applications 156-1, 156-2, 156-3.

The open framework 151 can be a service framework to provide a service by an application. In exemplary embodiments of the present general inventive concept, operation and configuration of an OSGi service framework are described as an example, but the open framework 151 is not limited to the OSGi service framework.

The AA framework 152 can be installed on the open framework 151, and can be a service framework to perform a process related to security. More specifically, the AA framework 152 may set security policy to be applied to the image forming apparatus 100 and may check authentication and authorization of a service request using a set security provider according to the set security policy. The AA framework 152 can drive the applications 156-1, 156-2, 156-3 to provide the service in response to the authenticated and authorized service request.

The applications 156-1, 156-2, 156-3 can be installed on the framework and provide the user with one or more services. More specifically, the plurality of applications 156-1, 156-2, and/or 156-3 may be installed on the AA framework 152 in, for example, a bundle form, and can control the function unit 140 to perform a requested service in response to a service request received through the communication interface unit 110 or through the UI unit 120. For example, the applications 156-1, 156-2, and/or 156-3 may be a copying application, a printing application, a faxing application, a scanning application, a scan to PC application, and a scan to FTP application.

Hereinafter, setting and changing security policy is described with reference to FIG. 3.

Figure 3:
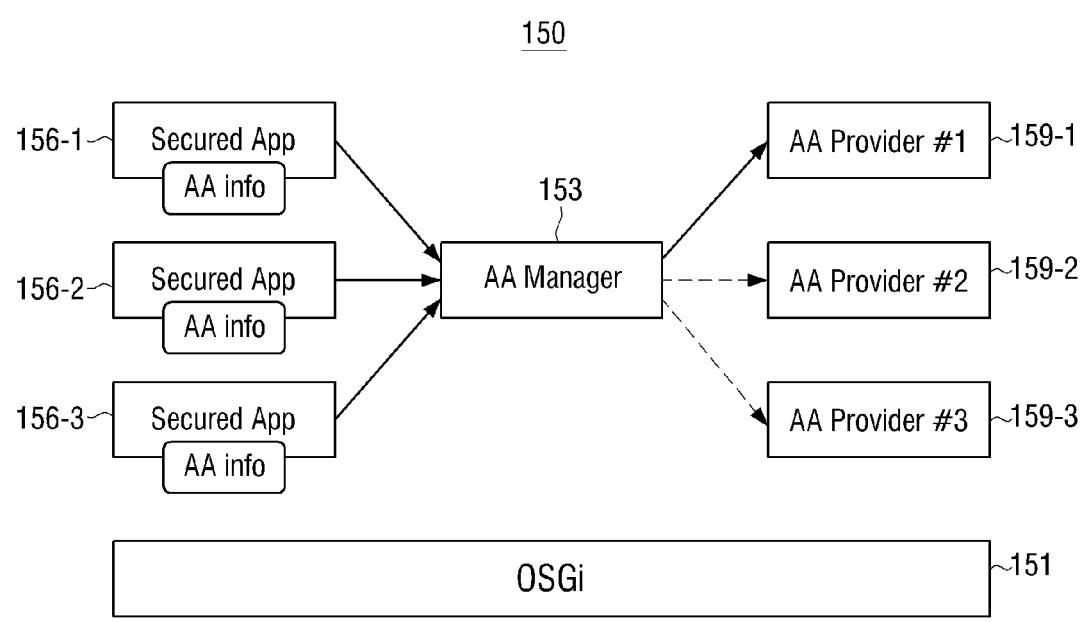

FIG. 3 is a block diagram illustrating a detailed configuration of the control unit 150 according to exemplary embodiments of the present general inventive concept. In FIG. 3, an AA manager 153 of the control unit 130 is illustrated, where the AA manager 153 manages the applications 156-1, 156-2, and 156-3, as well as the security providers 159-1, 159-2, and 159-3. In the control unit 150 illustrated in FIG. 2, the AA manager is not illustrated, as it would be included in the illustrated AA framework 152 in FIG. 2.

In exemplary embodiments of the present general inventive concept, a security policy can have three security modes. More specifically, the three security modes can include the first security mode in which authentication is not performed, the second security mode in which authentication is performed using a single security provider, and the third security mode in which authentication is performed for the plurality of applications 156-1, 156-2, 156-3 using different security providers.

The first security mode can be a security policy such that one or more users (e.g., all users) use all the functions of the image forming apparatus 100. In this security mode, authentication may be performed only when settings of the image forming apparatus 100 are changed.

The second security mode can be security policy to perform authentication for the plurality of applications 156-1, 156-2, and/or 156-3 using a single security provider 159-1 selected by the user. More specifically, one or more services can be provided to one or more users (e.g., all users), and authentication can be performed for the remaining services using, for example, a single set security provider. In the second security mode, authentication and authorization may be checked for all the services using a single security provider.

The third security mode can be a security policy to perform authentication for the plurality of applications 156-1, 156-2, and/or 156-3 using corresponding security providers. For example, authentication can be performed for the copying application 156-1 using the security provider 159-1 using an ID and a password, and authentication can be performed for the scanning application 156-2 using a security provider 159-2 using an RF card. In the third security mode, if a single application is authenticated using a plurality of security providers by stages, the single application may provide a service, or a plurality of security providers can be selectively used for a single application.

These security modes and security policies can be managed by the AA manager 153. If a service request is received, the AA manager 153 can check authentication and authorization of the requested service using the security provider installed according to the set security policy.

In FIG. 3, the three applications 156-1, 156-2, and 156-3 can be installed in the control unit 150. However, three or more applications may be installed in the control unit 150 according to the functions supported by the image forming apparatus 100. In FIG. 3, the image forming apparatus 100 can use one or more of the three security providers 159-1, 159-2, and/or 159-3, but additional security providers may be installed as described above, and a provider selected by the user may be removed.

That is, if the administrator wishes to change security policy of the image forming apparatus 100 from an authentication method using an RF card to an authentication method using an ID and a password, the administrator can easily change the security policy by installing a security provider performing authentication using an ID and a password in the image forming apparatus 100 without changing software. That is, for an authentication method which is not supported by the image forming apparatus 100, the user can dynamically change security policy by installing a security provider supporting the authentication method.

In the exemplary embodiments described with reference to FIGS. 1 through 3, the image forming apparatus 100 can access the external devices 10, 20, and/or 30 and can install a security provider. The management server 20 can provide a security provider to the image forming apparatus 100, control installation of the security provider, and change security policy of the image forming apparatus 100.

Figure 4:
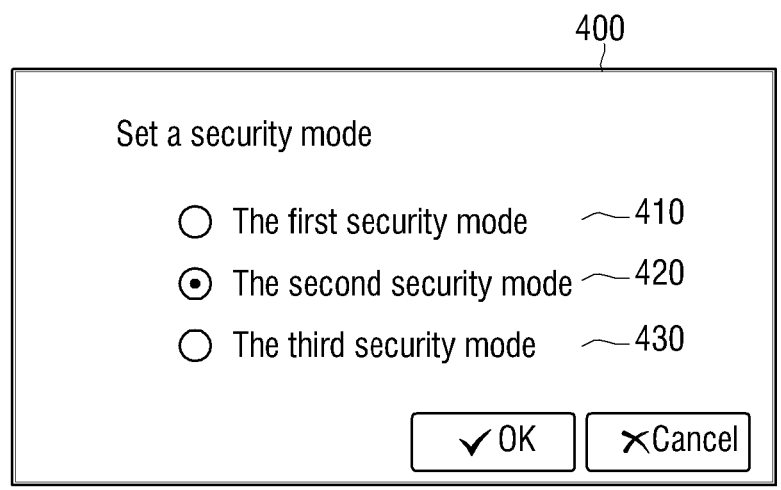
Figure 5:
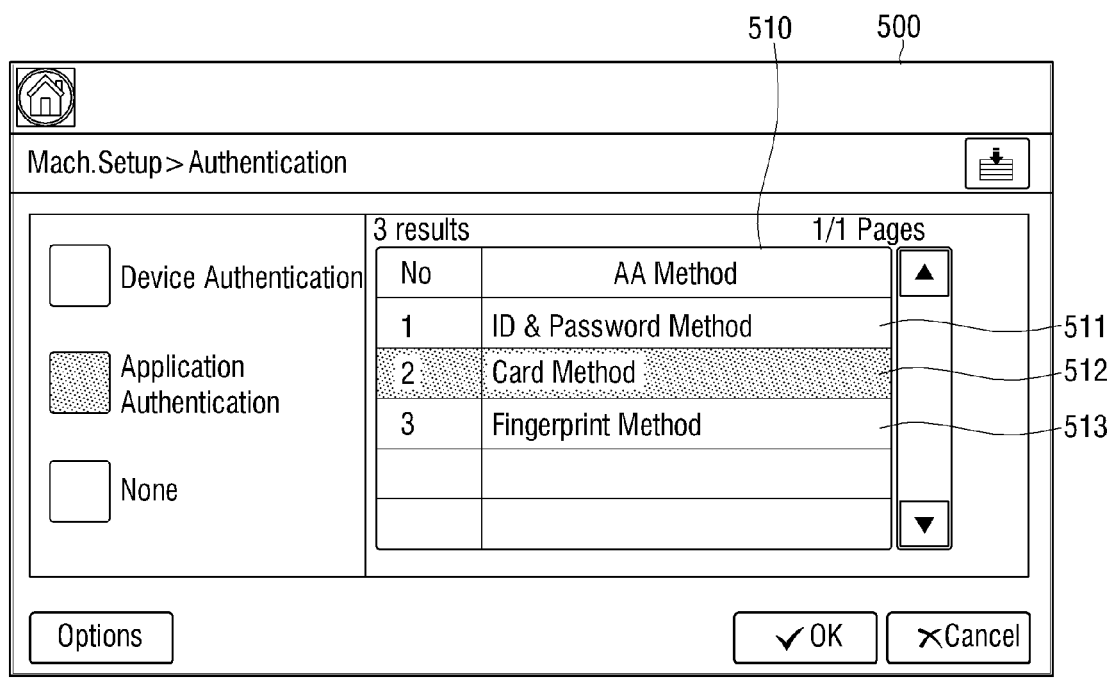

FIGS. 4 through 6 illustrate examples of a user interface window displayed on the UI unit 120 illustrated in FIG. 1.

Referring to FIG. 4, a UI window 400 can display a plurality of security modes 410, 420, and/or 430 to select a security mode to be applied to the image forming apparatus 100. In FIG. 4, the three security modes are illustrated, but three or more security modes may be used as described above.

If the user selects the first security mode 410 in which authentication is not performed, the image forming apparatus 100 can set security policy not to perform authentication and authorization control for the user's service request.

If the user selects the second security mode 420 in which authentication is performed using a single security provider, a UI window 500 illustrated in FIG. 5 may be displayed. If the user selects a security provider through the UI window 500, the image forming apparatus 100 can set security policy to perform authentication for the user's service request using the selected security provider.

If the user selects the third security mode 430 in which authentication is performed using a security provider corresponding to an application, the UI window 500 illustrated in FIG. 5 and a UI window 600 illustrated in FIG. 6 may be displayed (e.g., sequentially displayed). The image forming apparatus 100 can set security policy to perform authentication for an application selected by the user using the selected security provider.

Referring to FIG. 5, the UI window 500 can display a plurality of authentication methods 510 so that an authentication method to be performed by the image forming apparatus 100 can be selected. That is, the UI window 500 can display a plurality of security providers installed in the image forming apparatus 100.

More specifically, a first authentication method 511 can be an authentication method using an ID and a password received by the user, a second authentication method 512 can be an authentication method using an RF card or a magnetic card, and a third authentication method 513 can be an authentication method using a fingerprint. In FIG. 5, these three authentication methods are illustrated, but one or more other authentication methods can be used by receiving and installing a security provider from an external device as described above.

FIG. 6 illustrates an example of UI window 600 to select an application in application window 610 to apply an authentication method selected in FIG. 5. That is, UI window 600 may receive a selection of an authentication application. More specifically, the UI window 600 includes a first area 620 that may display the applications installed in the image forming apparatus 100, and a second area 630 that may illustrate whether or not it is possible to apply a currently selected authentication method to each application and select whether to apply the currently selected authentication method to each application.

The first area 620 can be an area displaying names of the applications installed in the image forming apparatus 100 or service contents. The second area 630 can be an area to select whether to apply the currently selected authentication method to each application. Accordingly, the user can easily select an application (i.e., service) to apply the currently selected authentication method (security provider).

In the first area 620, application names such as a copy application 621, a device setup application 622, a fax application 623, a print application 624, and a scan-to-email application 625 can be selectable applications to apply the currently selected authentication method to that are installed in the image forming apparatus 100. The second area 630 of the application window 610 illustrates a state (e.g., whether the currently selected authentication method is enabled or disabled for applications listed in the first area 620) of one or more of the applications 621-625. As illustrated in FIG. 6, the copy application 621 can be in a disabled stated, and the device setup application 622, the fax application 623, the print application 624, and the scan-to-email application 625 can be in an enabled state. That is, when an application selected to be in an enabled state, the currently selected authentication method can be applied to each of the selected applications (e.g., applications 622-625) and may not be applied to disabled and/or unselected applications (e.g., the copy application 621).

Figure 7:
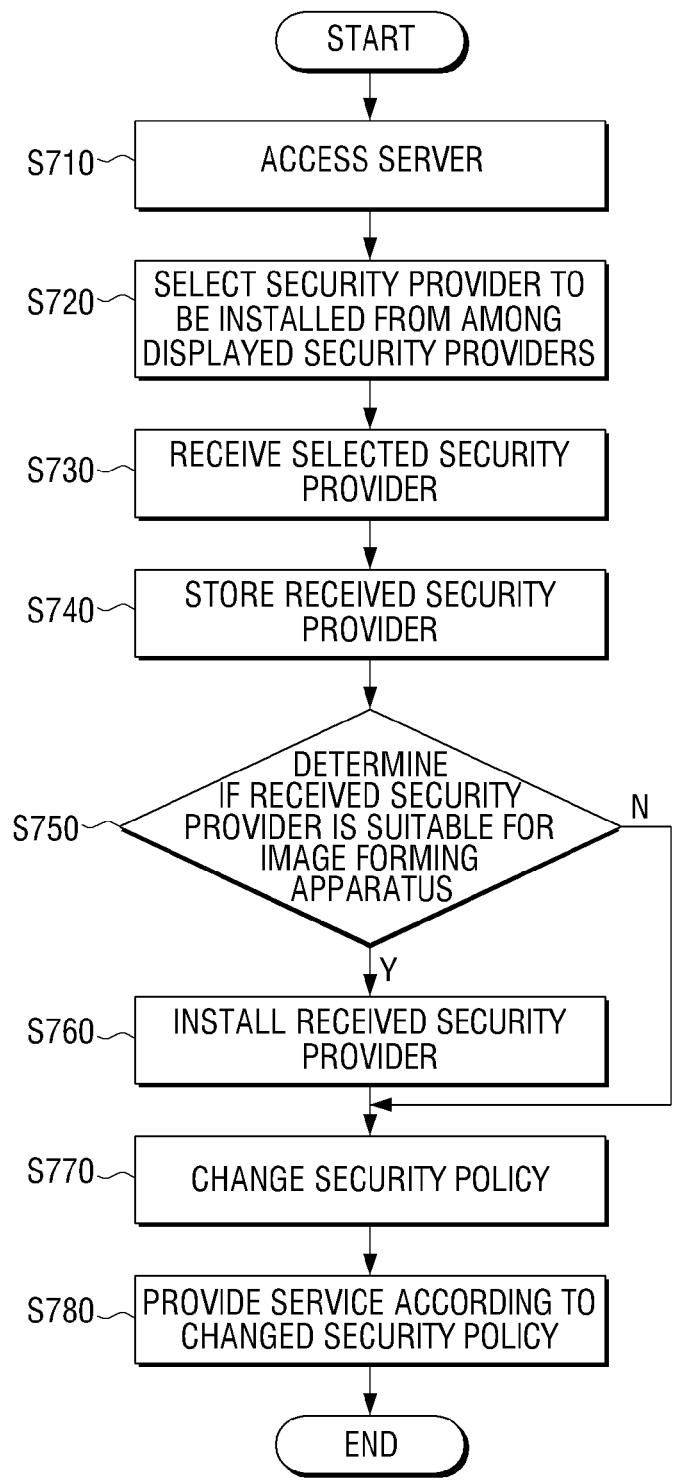
FIG. 7 is a flowchart illustrating a method of changing security policy according to exemplary embodiments of the present general inventive concept.

FIG. 7 is a flowchart illustrating a method of changing security policy according to exemplary embodiments of the present general inventive concept.

Referring to FIG. 7, in operation S710, the image forming apparatus 100 can access an external device which stores a plurality of security providers performing authentication in one or more methods. More specifically, the image forming apparatus 100 may access a web page (URL) or a file transfer protocol (FTP) management server which provides a plurality of security providers. Such an operation may be performed by connecting a portable storage medium to the image forming apparatus 100.

In operation S720, if the image forming apparatus 100 displays a list of a plurality of security providers stored in the accessed external device, the user can select at least one of the displayed security providers. In operation S730, the image forming apparatus 100 can receive the selected security provider from the external device. In operation S740, the image forming apparatus 100 can store the received security provider. In exemplary embodiments of the present general inventive concept, the image forming apparatus 100 can access the external device and can receive the security provider from the external device. In exemplary embodiments of the present general inventive concept, the external device can provide the image forming apparatus 100 with a security provider and can control the security provider to be installed in the image forming apparatus 100. More specifically, the management server 20 may transmit a security provider stored in the management server 20 to the image forming apparatus 100 so as to change a security policy of the image forming apparatus 100.

In operation S750, it can be determined if the received security provider is suitable for the image forming apparatus 100. More specifically, it can be determined if the image forming apparatus 100 can perform authentication using the received security provider. For example, in the image forming apparatus 100 which does not have an RF reader, if the received security provider is a security provider using an RF reader, the received security provider can be determined to be unsuitable for the image forming apparatus 100.

In operation S760, if the received security provider is determined to be suitable for the image forming apparatus 100, the received security provider can be installed in the open framework (e.g., open framework 151 of the control unit 150 illustrated in FIGS. 2 and 3).

In operation S770, at least one application to perform authentication using the installed security provider can be set so that security policy of the image forming apparatus 100 can be changed. More specifically, at least one application to apply the installed security provider can be selected, and the installed security provider can be set to be a user authentication method of the selected application so that security policy can be set. Setting security policy is described below in greater detail with reference to FIG. 8.

In operation S780, if a service request is received through an external device or a UI window, the requested service can be provided when performing authentication and authorization according to the changed security policy. Providing a service is described below with reference to FIGS. 9 and 10.

Figure 8:
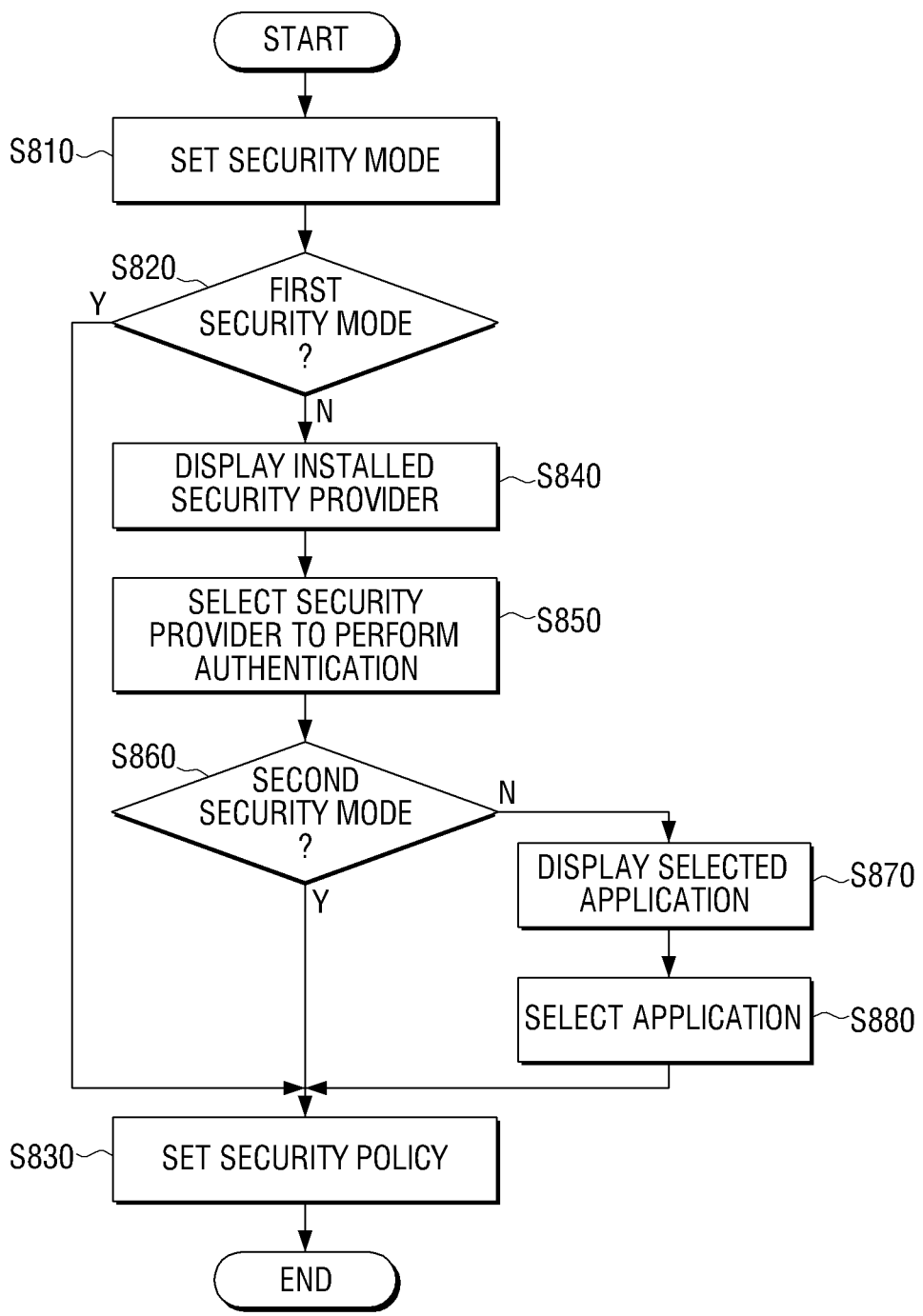
FIG. 8 is a flowchart illustrating the operation of changing security policy illustrated in FIG. 7 in greater detail.

FIG. 8 is a flowchart illustrating the operation of changing security policy (e.g., operation S770) illustrated in FIG. 7 in greater detail.

Referring to FIG. 8, in operation S810, a UI window to set a security mode can be displayed so that the user can set a security mode through the displayed UI window.

In operation S820, if it is determined that a security mode selected by the user is the first security mode (e.g., a security mode in which authentication is not performed), a security policy can be set not to perform authentication and authorization at operation S830 for the user's service request.

In operation S820, if it is determined that the security mode selected by the user is not the first security mode, a first UI window to select a security provider installed in the open framework can be displayed in operation S840, and, in operation S850, a security provider to perform authentication can be selected through the first UI window.

In operation S860, if it is determined that the security mode selected by the user is not the second security mode, a security policy is set to perform authentication in operation S830 for the user's service request using the security provider selected through the first UI window.

If the security mode selected by the user is not the first security mode or the second security mode, that is, the security mode is the third mode, in operation S870 the second UI window to set an application to perform authentication using the selected security provider can be displayed, and, in operation S880, an application to perform authentication using the selected security provider can be set through the second UI unit. In operation S830, security policy can be set to perform authentication for the application selected by the user using the selected security provider.

Figure 9:
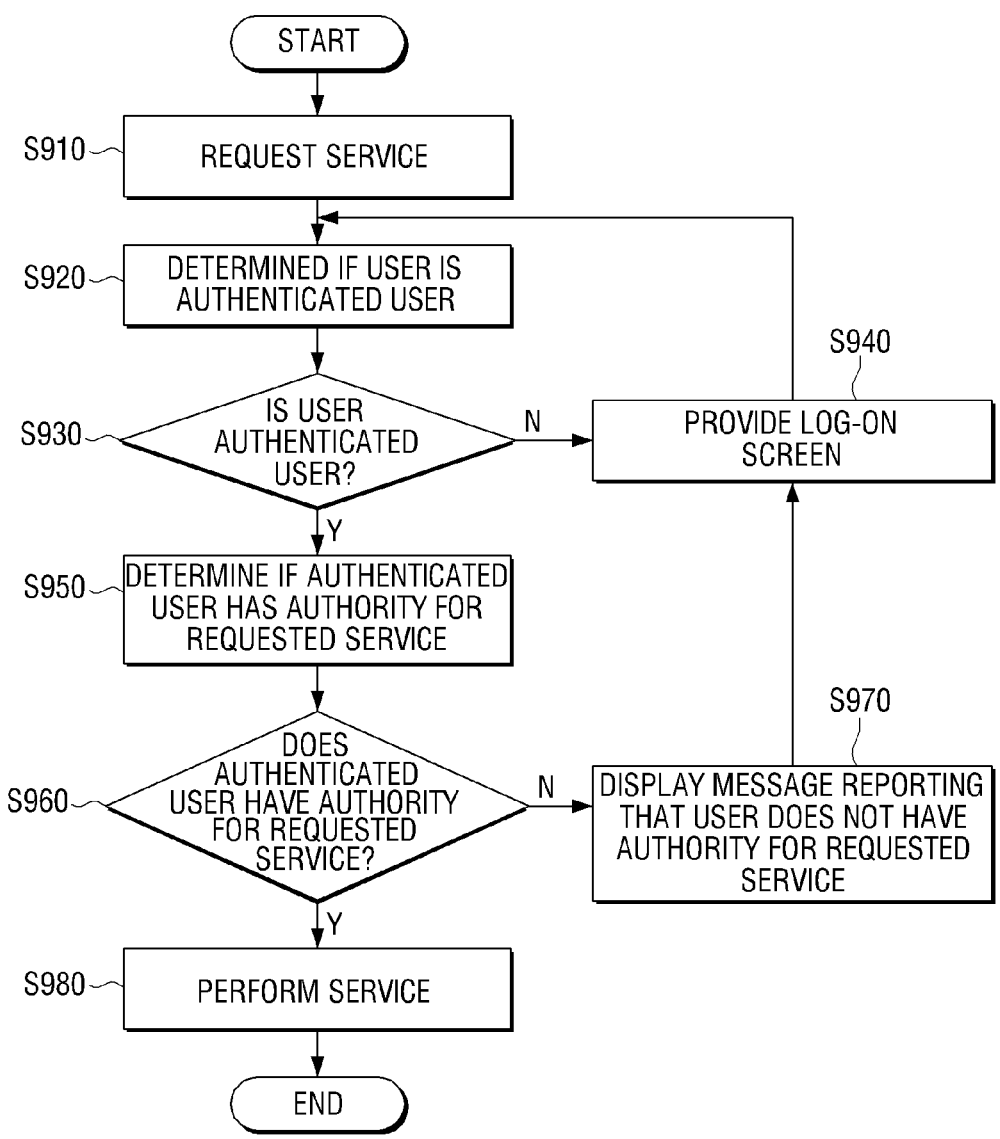

FIGS. 9 and 10 are flowcharts illustrating the operation of providing a service (e.g., operation S780) illustrated in FIG. 7 in greater detail.

Referring to FIG. 9, if the user requests a service in operation S910 through a UI window, in operation S920 it can be determined if the user is an authenticated user. More specifically, authentication can be performed using a security provider corresponding to the requested service according to the preset security policy.

If it is determined in operation S930 that the user is an authenticated user, it can be determined if the authenticated user has authority for the requested service in operation S950.

If it is determined that the user is not an authenticated user in operation S930, authentication can be performed using a security provider supporting a different authentication method in operation S940. More specifically, authentication may be performed by changing an authentication method from a method using an RF card to a method using an ID and a password.

If it is determined in operation 960 that the user is an authorized user, the requested service is provided in operation S980. However, if it is determined in operation 960 that the user is an authenticated user but has no authority for the requested service, a message reporting that the requested service cannot be supported is displayed in operation S970.

FIG. 10 is a flowchart illustrating a method of providing a service when the service is requested through the communication interface unit 110 of the image forming apparatus 100. Detailed operation can be the same as the operation illustrated in FIG. 9, but in operation S1040, an exception corresponding to an unauthenticated service request or an unauthorized service request can be reported to an external device. That is, an error message reporting that the image forming apparatus 100 may not perform the requested service is transmitted to the external device. Operation S910 and S1010, S920 and S1020, S930 and S1030, S950 and S1050, S960 and S1060, and S980 and S1070 correspond to one another. That is, operations S1010, S1020, S1030, S1050, S1060, and S1070 are described above in connection with operations S910, S920, S930, S950, S960, and S980.

Accordingly, in this method of changing security policy, security policy can be dynamically changed by receiving a security provider from the external device and installing the security provider without changing software installed in the image forming apparatus 100. The methods illustrated in FIGS. 7 through 10 can be executed by image forming apparatuses having a configuration illustrated in FIG. 1 and by image forming apparatuses having different configurations.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of setting security policy of an image forming apparatus which is connectable to an external device via a communication interface, is print related to a printing job and includes an open framework on which applications corresponding to at least one of a printing function, a copying function, a faxing function, a scanning function, a scan to personal computer (PC) function, and a scan to file transfer protocol (FTP) function are installed, the method comprising:

accessing the external device storing at least one security provider corresponding to user authentication via the communication interface;
selecting the security provider;
receiving the selected security provider at the image forming apparatus;

installing the received security provider in the image forming apparatus;
selecting at least one application to apply the installed security provider and setting the installed security provider as a user authenticator for the at least one selected application;
mapping the at least one selected application onto the installed security provider and storing mapping information as a database;
displaying the stored database;
receiving a request to perform a function provided by the image forming apparatus;
performing authentication for the request function using a security provider corresponding to the requested function and a security information which is used to determine if a user requesting a function is an authenticated user and if the authenticated user has the authority to use the function; and
providing the requested function using an application corresponding to the request when the request is authenticated,
wherein the security provider can indicate and/or identify a program which performs authentication and authorization control in the image forming apparatus.

2. The method according to claim 1, further comprising:
displaying the received security provider,
wherein in the installing of the received security provider, a security provider selected from the displayed security provider is installed in the image forming apparatus.

3. The method according to claim 1, wherein in the setting of the installed security provider, the installed security provider is set as the user authenticator for the selected application using security information corresponding to the at least one selected application.

4. The method according to claim 1, wherein the installing of the received security provider comprises:
determining whether the image forming apparatus can perform authentication with the received security provider; and
installing the received security provider in the image forming apparatus when it is determined that the image forming apparatus can perform authentication with the received security provider.

5. The method according to claim 1, wherein the performing of authentication when the request is unauthenticated comprises:
authenticating the request using a security provider which is different from the security provider corresponding to the requested function.

6. A method of setting security policy of an image forming apparatus having a user interface unit and a control unit, the image forming apparatus being connectable to an external device via a communication interface and includes an open framework on which applications corresponding to at least one of a printing function, a copying function, a faxing function, a scanning function, a scan to personal computer (PC) function, and a scan to file transfer protocol (FTP) function are installed, the method comprising:
receiving a command to change the security policy of the image forming apparatus and receiving a request to perform a function provided by the image forming apparatus with the user interface unit;
displaying the security policy set for the image forming apparatus and security providers installed in the image forming apparatus with the user interface unit;
selecting at least one of the displayed security providers with the user interface unit;
setting the selected security provider as a user authenticator for the plurality of applications with the control unit;
selecting at least one application with the user interface unit to apply the selected security provider with the control unit,
mapping the at least one selected application onto the selected security provider and storing mapping information as a database;
displaying the stored database;
receiving a request to perform a function provided by the image forming apparatus; and
performing an authentication for the request using a security provider corresponding to the requested function and a security function which is used to determine if a user requesting a function is an authenticated user and if the authenticated user has the authority to use the function with the control unit;
wherein the security provider can indicate and/or identify a program which performs authentication and authorization control in the image forming apparatus, and
wherein the authentication is performed for a plurality of applications using different security providers.

7. The method according to claim 6,
wherein in the setting of the selected security provider, the selected security provider is set as the user authenticator for the at least one selected application.

8. The method according to claim 6, further comprising:
selecting a security mode with the user interface unit,
wherein in the setting of the selected security provider, the selected security provider is set as the user authenticator for the at least one selected application according to the selected security mode.

9. The method according to claim 8, wherein the security mode includes at least one of a first security mode in which authentication is not performed, a second security mode in which authentication is performed using a single security provider, and a third security mode in which authentication is performed using a plurality of security providers.

10. The method according to claim 6, wherein the command to change the security policy is received through at least one of the external device and a user interface window of the image forming apparatus.

11. An image forming apparatus which is connectable to an external device and includes an open framework on which applications corresponding to at least one of a printing function, a copying function, a faxing function, a scanning function, a scan to personal computer (PC) function, and a scan to file transfer protocol (FTP) function are installed, the image forming apparatus comprising:
a communication interface unit to access the external device storing at least one security provider corresponding to user authentication;
a user interface (UI) unit to select the security provider;
a storage unit to receive the selected security provider from the external device and store the received security provider; and
a microprocessor to install the stored security provider in the image forming apparatus, select at least one application to apply the installed security provider, and set the installed security provider as a user authenticator for the at least one selected application,
wherein the security provider can indicate and/or identify a program which performs authentication and authorization control in the image forming apparatus, wherein the storage unit maps the at least one selected application onto the installed security provider, stores mapping information as a database, and displays the stored database, and wherein the microprocessor performs authentication for a request function using a security provider corresponding to the requested function and a security information which is used to determine if a user requesting a function is an authenticated user and if the authenticated user has the authority to use the function when a request to perform a function provided by the image forming apparatus is received, and to provide the requested function using an application corresponding to the request when the request is authenticated.

12. The image forming apparatus according to claim 11, wherein the UI unit displays the stored security provider, and the microprocessor installs a security provider selected from the displayed security provider in the image forming apparatus.

13. The image forming apparatus according to claim 11, wherein the microprocessor sets the installed security provider as the user authenticator for the selected application using security information corresponding to the at least one selected application.

14. The image forming apparatus according to claim 11, wherein the UI unit displays a first UI window to select the security provider installed in the image forming apparatus, and when the security provider is selected through the first UI window, the UI unit displays a second UI window to select an application to perform authentication using the selected security provider, and wherein when the application is selected through the second UI window, the microprocessor changes a security policy to authenticate using the selected security provider when the selected application operates.

15. The image forming apparatus according to claim 11, wherein the UI unit displays a first UI window to select the security provider installed in the image forming apparatus, and wherein when the security provider is selected through the first UI window, the microprocessor changes a security policy to authenticate using the selected security provider when the plurality of applications operate.

16. The image forming apparatus according to claim 11, wherein the communication interface unit or the UI unit receives a request to perform a function provided by the image forming apparatus, and the microprocessor performs authentication for the request using a security provider corresponding to the requested function, and provides the requested function using an application corresponding to the request when the request is authenticated.

17. A method of setting security policy of an image forming apparatus which performs at least one of a printing function, a copying function, a faxing function, a scanning function, a scan to personal computer (PC) function, and a scan to file transfer protocol (FTP) function, the method comprising:
receiving a selection of at least one security provider stored on an external device that is communicatively coupled to the image forming apparatus, the at least one security provider to be installed on the image forming apparatus;
installing the selected at least one security provider;
selecting at least one application to apply the installed security provider;
mapping the at least one selected application onto the installed security provider and storing mapping information as a database;
displaying the stored database;
setting the selected security provider as a user authenticator for at least one function of the image forming apparatus;
receiving a request to perform a function provided by the image forming apparatus;
performing authentication for the request function using a security provider corresponding to the requested function and a security information which is used to determine if a user requesting a function is an authenticated user and if the authenticated user has the authority to use the function; and
providing the requested function using an application corresponding to the request when the request is authenticated,
wherein the security provider can indicate and/or identify a program which performs authentication and authorization control in the image forming apparatus.

18. The method of claim 17, wherein the installing of the selected security provider comprises:
determining if the image forming apparatus can perform authentication with the selected security provider; and
installing the selected security provider in the image forming apparatus when it is determined that the image forming apparatus can perform authentication with the selected security provider.

19. The method of claim 18, wherein the determining if the selected security provider is suitable for the image forming apparatus comprises:
determining whether the user authenticator can authenticate a user with the selected security provider; and
when the user authenticator can not authenticate the user with the selected security provider, setting another selected security provider as the user authenticator to authenticate the user.

20. The method of claim 17, further comprising:
receiving a request to perform a first function of the at least one function provided by the image forming apparatus;
performing authentication for the request with a first security provider of the installed at least one security provider corresponding to the requested first function; and
providing the requested first function when the request is authenticated.

21. An image forming apparatus which performs at least one of a printing function, a copying function, a faxing function, a scanning function, a scan to personal computer (PC) function, and a scan to file transfer protocol (FTP) function, comprising:
an interface to receive a selection of at least one security provider stored on an external device that is communicatively coupled to the image forming apparatus, the at least one security provider to be installed on the image forming apparatus; and
a microprocessor to install the selected at least one security provider on the image forming apparatus, and to set the selected security provider as a user authenticator for at least one function of the image forming apparatus,
wherein the security provider can indicate and/or identify a program which performs authentication and authorization control in the image forming apparatus, and a storage unit maps the indicated and/or identified program onto the installed security provider, stores mapping information as a database, and displays the stored database,
wherein the microprocessor performs authentication for a request function using a security provider corresponding to the requested function and a security information which is used to determine if a user requesting a function is an authenticated user and if the authenticated user has the authority to use the function when a request to perform a function provided by the image forming apparatus is received, and to provide the requested function using an application corresponding to the request when the request is authenticated.

22. The apparatus of claim 21, wherein the microprocessor determines if the image forming apparatus can perform authentication with the selected security provider, and installs the selected security provider in the image forming apparatus when it is determined that the image forming apparatus can perform the authentication with the selected security provider.

23. The apparatus of claim 22, wherein the microprocessor determines whether the user authenticator can authenticate a user with the selected security provider, and the controller sets another selected security provider as the user authenticator to authenticate the user when the user authenticator cannot authenticate the user with the selected security provider.

24. The apparatus of claim 21, wherein the interface receives a request to perform a first function of the at least one function provided by the image forming apparatus, and the microprocessor performs authentication for the request with a first security provider of the installed at least one security provider corresponding to the requested first function, and the image forming apparatus provides the requested first function when the request is authenticated by the controller.

* * * * *